US009843343B2

(12) United States Patent
Alicioglu

(10) Patent No.: US 9,843,343 B2
(45) Date of Patent: Dec. 12, 2017

(54) SWITCHED MULTIPLEXER

(71) Applicant: ASELSAN ELEKTRONIK SANAYI VE TICARET ANONIM SIRKETI, Ankara (TR)

(72) Inventor: Bulent Alicioglu, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 296 days.

(21) Appl. No.: 14/428,986

(22) PCT Filed: Mar. 1, 2013

(86) PCT No.: PCT/IB2013/051637
§ 371 (c)(1),
(2) Date: Mar. 18, 2015

(87) PCT Pub. No.: WO2014/045129
PCT Pub. Date: Mar. 27, 2014

(65) Prior Publication Data
US 2015/0280753 A1    Oct. 1, 2015

(30) Foreign Application Priority Data
Sep. 18, 2012    (TR) ................ 2012 10644

(51) Int. Cl.
H04B 1/00    (2006.01)
H04W 72/04    (2009.01)
H01P 1/213    (2006.01)

(52) U.S. Cl.
CPC ............ H04B 1/006 (2013.01); H01P 1/213 (2013.01); H04B 1/0057 (2013.01); H04W 72/0453 (2013.01)

(58) Field of Classification Search
CPC ........ H04B 1/0057; H04B 1/006; H04B 1/30; H01P 1/213
See application file for complete search history.

(56) References Cited

U.S. PATENT DOCUMENTS 5,021,756 A * 6/1991 Tajima ................. H03H 11/04
330/286
2006/0087387 A1* 4/2006 Kubota ............... H03H 7/0123
333/204

(Continued)

FOREIGN PATENT DOCUMENTS

EP    0744628 A2    11/1996

OTHER PUBLICATIONS

Alicioglu B et al: "Switched multiplexer design using Parallel Coupled Line three ports", Microwave Symposium (MMS), 2010 Mediterranean, IEEE, Piscataway, NJ, USA, Aug. 25, 2010 (Aug. 25, 2010), pp. 204-207, XP031777753, ISBN: 978-1-4244-7241-3 abstract; figure 2.

(Continued)

*Primary Examiner* — Ayaz Sheikh
*Assistant Examiner* — Debebe Asefa
(74) *Attorney, Agent, or Firm* — Gokalp Bayramoglu

(57)    ABSTRACT

This invention is about the switched multiplexers used for adaptive filtering in systems operating in signal dense environments such as electronic warfare systems. The aim of this invention is to design a switched multiplexer with lower input/output return losses and having lower level of destructive interaction between channels compared to the known examples.

8 Claims, 3 Drawing Sheets

(56) References Cited

U.S. PATENT DOCUMENTS

Figure 1:
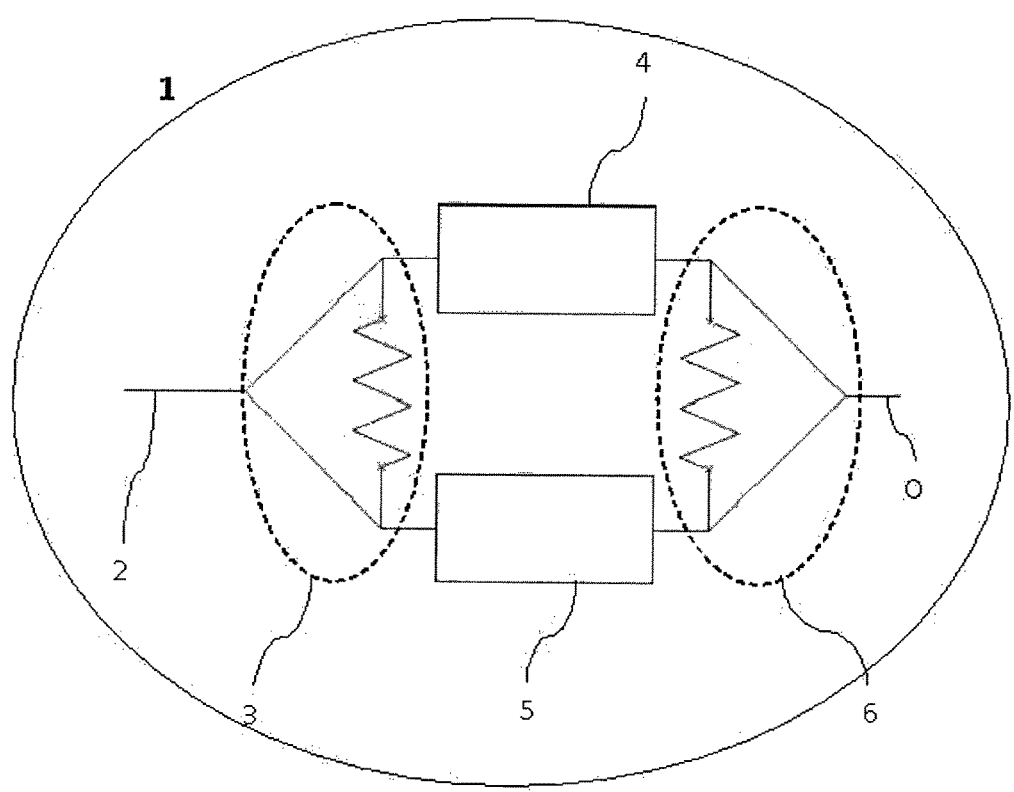

2009/0079881 A1    3/2009  White et al.
2010/0166000 A1    7/2010  Hardcastle
2011/0175789 A1*   7/2011  Lee .................. H01Q 1/243
                                                  343/853

OTHER PUBLICATIONS

Apaydin O et al:"Design of diplexers with prescribed crossover loss using singly terminated filters", Electrotechanical Conference, 1994. Proceedings., 7th Mediterranean Antalya, Turkey Apr. 12-14, 1994, New York, NY, USA, IEEE, Apr. 12, 1994 (Apr. 12, 1994), pp. 508-511, AP010130747, DOI: 10.1109/MELCON.1994.381045 ISBN:978-0-7803-1772-7.
Rhodes J D:"Suspended Substrate Filters and Multiplexers", Microwave Conference, 1986, 16th European, IEEE, Piscataway, NJ USA, Sep. 8, 1986 (Sep. 8, 1986), pp. 8-18.

* cited by examiner

SWITCHED MULTIPLEXER

TECHNICAL FIELD

This invention is about the switched multiplexer module used in e.g. electronic warfare systems which operate in signal dense environments.

PREVIOUS TECHNIQUE

Today's electronic warfare systems operate in wide and variable frequency bands. To satisfy the performance requirements switched multiplexers are designed.

In the known switched multiplexer realization, the numbers of power dividers used equals the number of channels in the switched multiplexer. The multiplexers combined by the power splitters are different from each other, this causes a non-symmetrical structure which leads to an increase in return loss.

In the multiplexers, there are no guard bands between channels. Thus the response becomes quite sensitive to manufacturing tolerances.

The module referred as the known switched multiplexer is patented in USA under patent number US 2010166000.

The document titled "The Use of Matched Four-Port Filters to Realize Switched Multiplexer Having Low Amplitude and Group Delay Ripple" discloses a design method for channelizers and multiplexers. By using two recombining multiplexers, one for the odd-numbered channels and one for the even-numbered channels, a high-performance switched multiplexer may be realized The document titled "Switched multiplexer design using Parallel Coupled Line three ports" discloses that Parallel Coupled Line (PCL) three ports can be used to design switched multiplexers with wide or narrow channel bandwidths.

The document titled "Design of diplexers with prescribed crossover loss using singly terminated filters" discloses two methods to design frequency symmetric diplexers with any realizable prescribed crossover attenuation. The two methods are based on the use of singly terminated low-pass (LP) and high-pass (HP) filter pairs that are readily available or that can be easily synthesized.

BRIEF EXPLANATION OF THE INVENTION

The purpose of this invention is to realize a switched multiplexer having a low input and output return loss The purpose of this invention is to realize a switched multiplexer having lower interference between channels compared to the known the switched multiplexer.

DETAILED EXPLANATION OF THE INVENTION

Figure 2:
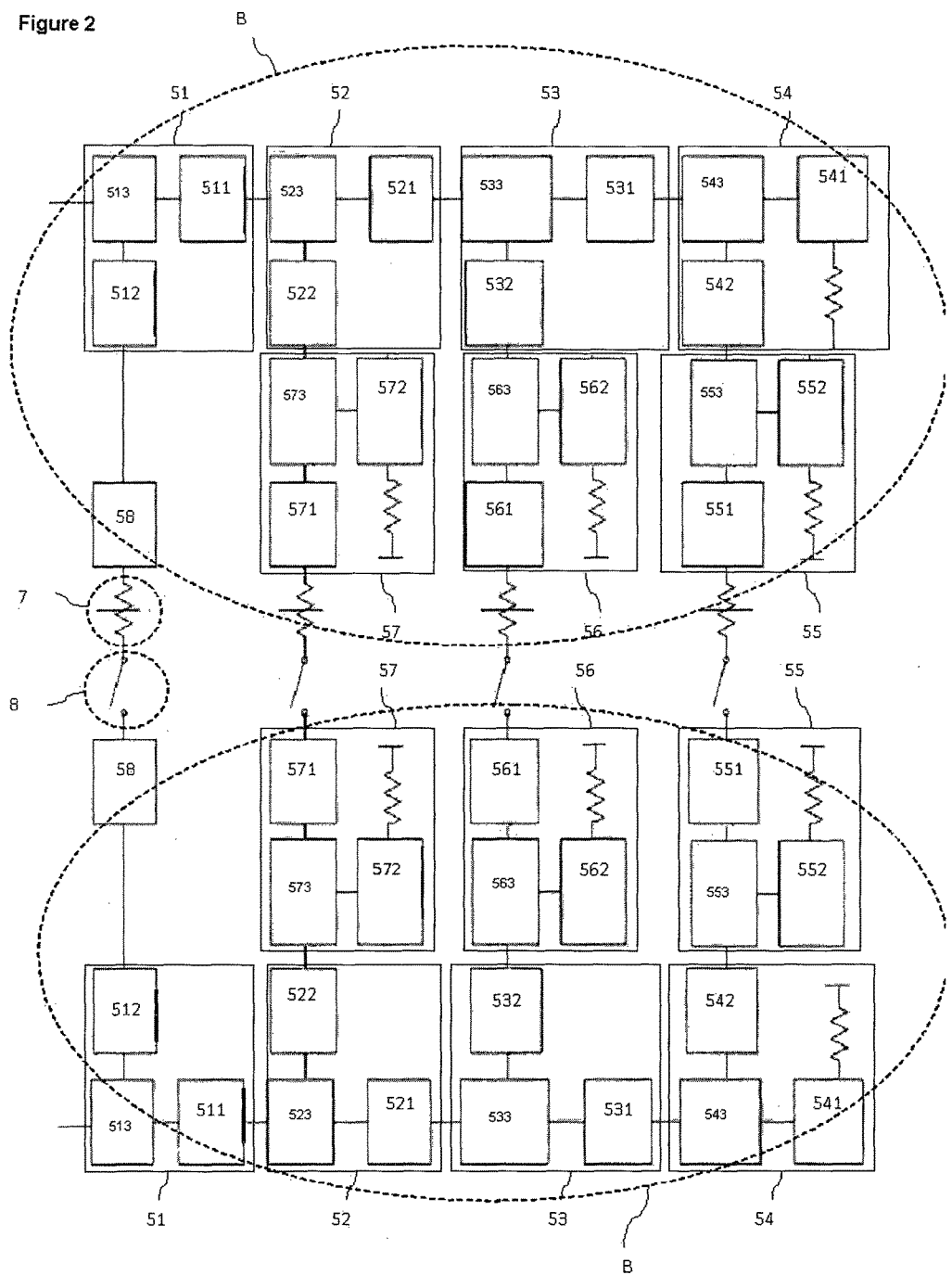
Figure 3:
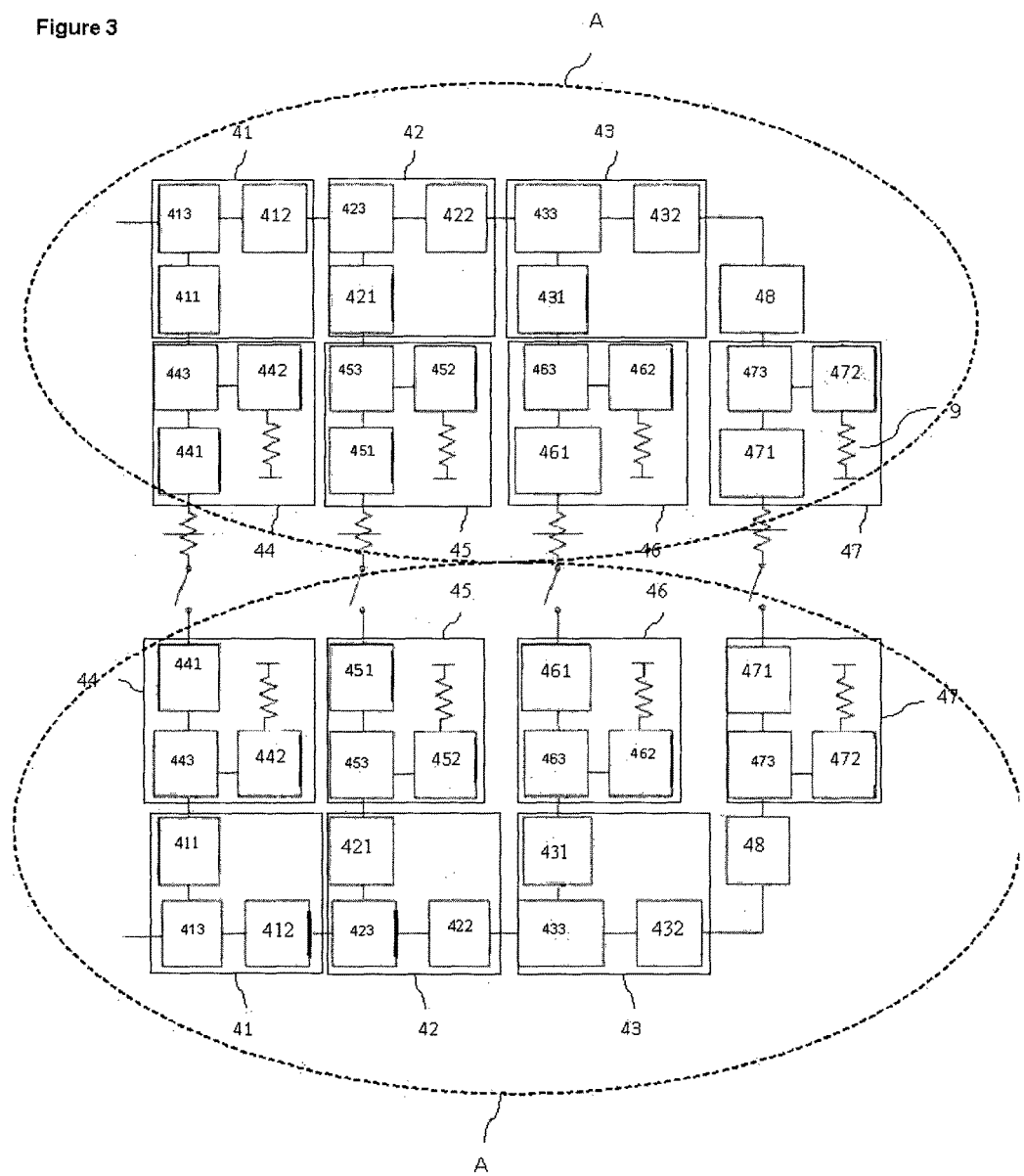

The switched multiplexer designed for achieving the above stated aims is shown in figures attached. These figures are:

FIG. 1. Schematics of the switched multiplexer
FIG. 2. Schematics for the second block
FIG. 3. Schematics for the first block Each element in the figures are numbered as given as below:
1. Switched Multiplexer
2. RF Input
3. Power Splitter
4. First Block
   41. 14 GHz diplexer
      411. 14 GHz highpass filter
      412. 14 GHz lowpass filter
      413. 14 GHz diplexing end
   42. 10 GHz diplexer
      421. 10 GHz highpass filter
      422. 10 GHz lowpass filter
      423. 10 GHz diplexing end
   43. 6 GHz diplexer
      431. 6 GHz highpass filter
      432. 6 GHz lowpass filter
      433. 6 GHz diplexing end
   44. 16 GHz diplexer
      441. 16 GHz lowpass filter
      442. 16 GHz highpass filter
      443. 16 GHz diplexing end
   45. 12 GHz diplexer
      451. 12 GHz lowpass filter
      452. 12 GHz highpass filter
      453. 12 GHz diplexing end
   46. 8 GHz diplexer
      461. 8 GHz lowpass filter
      462. 8 GHz highpass filter
      463. 8 GHz diplexing end
   47. 4 GHz diplexer
      471. 4 GHz lowpass filter
      472. 4 GHz highpass filter
      473. 4 GHz diplexing end
   48. 2 GHz highpass filter
5. Second Block
   51. 16 GHz diplexer
      511. 16 GHz lowpass filter
      512. 16 GHz highpass filter
      511. 16 GHz diplexing end
   52. 12 GHz diplexer
      521. 12 GHz lowpass filter
      522. 12 GHz highpass filter
      523. 12 GHz diplexing end
   53. 8 GHz diplexer
      531. 8 GHz lowpass filter
      532. 8 GHz highpass filter
      533. 8 GHz diplexing end
   54. 4 GHz diplexer
      541. 4 GHz lowpass filter
      542. 4 GHz highpass filter
      543. 4 GHz diplexing end
   55. 6 GHz diplexer
      551. 6 GHz lowpass filter
      552. 6 GHz highpass filter
      553. 6 GHz diplexing end
   56. 10 GHz diplexer
      561. 10 GHz lowpass filter
      562. 10 GHz highpass filter
      563. 10 GHz diplexing end
   57. 14 GHz diplexer
      571. 14 GHz lowpass filter
      572. 14 GHz highpass filter
      573. 14 GHz diplexing end
   58. 18 GHz lowpass filter
6. Second Power Splitter
7. Attenuator
8. RF switch
9. Resistor
O. RF Output
A. Odd Channel Non-Contiguous Multiplexer
B. Even Channel Non-Contiguous Multiplexer The switched multiplexer (1), subject of this invention, in its basic form consists of the following:
- at least one RF input (2),
- a power splitter (3), dividing the RF input into two
- a first block (4), which fulfills the filtering function in the preferred channels, containing only diplexers switches (8) and resistors (9).
- a second block (4), which fulfills the filtering function in the preferred channels not covered by the first block (4), containing only diplexers, switches and resistors.
- a power combiner, combining the outputs of the first (4) and second (5) blocks.

In the invented switched multiplexer (1) RF input (2) is divided by a power splitter (3) and fed to first (4) and second (5) blocks.

First (4) and Second (5) blocks exhibit a non-contiguous switched multiplexer behaviour as they have switchable channel filters.

The first and second blocks (4), (5) are combined via power splitter (6) to form the switched multiplexer (1).

In the preferred application of the invention a 2-18 GHz switched multiplexer (1) with evenly spaced channels is implemented. In this application, first block (4) contains 2-4 GHz, 6-8 GHz, 10-12 GHz, 14-16 GHz channels (channel filters) named as odd numbered or shortly odd channels. The second block (5) contains 4-6 GHz, 8-10 GHz, 12-14 GHz, 16-18 GHz channels (channel filters) named as even numbered or shortly even channels The channels in the first block (4) are formed in the following way;

The 14 GHz lowpass channel (412) of 14 GHz diplexer (41) is connected to the 10 GHz diplexer end (423) 10 GHz lowpass channel (422) of 10 GHz diplexer (42) is connected to the 6 GHz diplexer end (433), 6 GHz lowpass channel (432) of 6 GHz diplexer (43) is connected to the 2 GHz highpass filter (48). Highpass channels (411), (421), (431) of the diplexers (41),(42),(43) and 2 GHz highpass filter (48) are connected to diplexing ends (443), (453), (463) and (473) of the diplexers (44), (45), (46) and (47) respectively. The highpass channels 16 GHz, 12 GHz, 8 GHz ve 4 GHz (442), (452), (462), (472) are terminated to the resistors (9). The lowpass channels (441), (451), (461), (471) of diplexers (44), (45), (46) and (47) are fed to the output, hence the non-contiguous multiplexer (A) with channels 14-16 GHz, 10-12 GHz, 6-8 GHz and 2-4 GHz is constructed. To form the non-contiguous odd channeled switched multiplexer, two identical non-contiguous multiplexers (A) are used. Attenuators and switches are connected between the outputs (441), (451), (461), (471) of identical non-contiguous multiplexers (to form the switchable multiplexer. The RF input of the formed non-contiguous switched multiplexer is the 14 GHz diplexer end (413) on the attenuators' (7) side. The output is the 14 GHz diplexer end (413) on the switch side (8). Thus the non-contiguous switched multiplexer with 4 evenly spaced channels (14-16 GHz, 10-12 GHz, 6-8 GHz and 2-4 GHz) is constructed.

The second block is formed in the following way;

The 16 GHz lowpass channel (511) of 16 GHz diplexer (51) is connected to the 12 GHz diplexer end (523), 12 GHz lowpass channel (521) of 12 GHz diplexer (52) is connected to the 8 GHz diplexer end (533), 8 GHz lowpass channel (532) of 8 GHz diplexer (53) is connected to the 4 GHz diplexer end (543). Highpass channels (512), (522), (532), (542) of the diplexers (51),(52),(53) and (54) are connected to 18 GHz lowpass filter (58) and diplexing ends (573), (563), (553) of the diplexers (57), (56), (55) respectively. The highpass channels 16 GHz, 12 GHz, 8 GHz and 4 GHz (512), (522), (532), (542) are terminated to the resistors (9). The output of 18 GHz lowpass filer (58) and lowpass channels (571), (561), (551) of-diplexers (57), (56), (55) are fed to the output, hence the non-contiguous multiplexer (B) with channels 16-18 GHz, 12-14 GHz, 8-10 GHz and 4-6 GHz is constructed. To form the non-contiguous even-channeled switched multiplexer, two identical non-contiguous multiplexers (A) are used. Attenuators and switches are connected between the outputs (58), (571), (561), (551) of identical non-contiguous multiplexers to form the switchable multiplexer. The RF input of the formed non-contiguous switched multiplexer is the 16 GHz diplexer end (513) on the attenuators' (7) side. The output is the 16 GHz diplexer end (513) on the switch side (8). Thus the non-contiguous switched multiplexer with 4 evenly spaced channels (16-18 GHz, 12-14 GHz, 8-10 GHz and 4-6 GHz) is constructed.

The outputs of the first (4) and second (5) blocks are combined by power splitter (6) to form 8 channel switched multiplexer.

In the preferred application of the invention the resistor value is 50 ohms.

In the preferred application of the invention Open Circuited Parallel Coupled Lines (OCPCL) are used for diplexing in the diplexers as diplexing ends. The use of OCPCL enhances the isolation between highpass and lowpass channels and provides a means for preventing the degradations in the cross-over frequencies.

In the preferred application of the invention the channel filters are designed as singly terminated filters, enabling the integration of OCPCL at synthesis level, thus OCPCL serves as an integral part of the diplexer contributing to the performance.

The separation of the channels in blocks (4) and (5) as odd and even channels provides (mud bands, thus increases isolation, moreover it reduces destructive interference between channels which may lead to degradations in rejection and shifts in cross-over frequencies and increases the immunity of the design to manufacturing tolerances.

Despite the use of large number of power splitters in the known case, in this invention, only two power splitters (3), (6) are used whatever the number of channels is.

Since the multiplexers forming the blocks (4) and (5) are symmetric the return loss will be same at the input and output. Higher rejection values are possible with lower order diplexers, as every diplexer is used twice in blocks (4) and (5).

Using the basics concepts introduced above, various application can be developed. The invention can not be restricted to the application outlined above and it is in fact as it is states in the claims.

The invention claimed is:

1. A switched multiplexer comprising:
at least one RF input;
a first power splitter for dividing the RF input into a first output and a second output, wherein the first output is applied to a first block and the second output is applied to a second block;
the first block for filtering the first output of the first power splitter, the first block comprising two identical odd channel non-contiguous multiplexers (A), wherein each non-contiguous multiplexer (A) comprises a plurality of diplexing ends, a plurality of resistors, a plurality of highpass filters, and a plurality of low pass filters, wherein the first block filters the first output of the first power splitter with the plurality of highpass filters and the plurality of low pass filters;

the second block for filtering the second output of the first power splitter, the second block comprising two identical even channel non-contiguous multiplexers (B), wherein each multiplexer (B) comprises a plurality of diplexing ends, a plurality of resistors, a plurality of highpass filters, and a plurality of low pass filters, wherein the second block filters the second output of the first power splitter with the plurality of highpass filters and the plurality of low pass filters, wherein the first block processes the first output of the first power splitter and the second block processes the second output of the first power splitter, a second power splitter for combining the outputs of the first block and the output of the second block;

wherein the first block and the second block exhibit a non-contiguous switched multiplexer behaviour as the first block and the second block have switchable channel filters;

wherein odd channels include 2-4 GHz, 6-8 GHz, 10-12 GHz, 14-16 GHz, and even channels include 4-6 GHz, 8-10 GHz, 12-14 GHz, 16-18 GHz.

2. The switched multiplexer of claim 1, wherein the first block consists of a plurality of evenly spaced channels starting from 2-4 GHz with a 4 GHz increment in corner frequencies, in each consecutive channel, all channels having 2 GHz bandwidth.

3. The switched multiplexer of claim 1, wherein the first block consists of a plurality of evenly spaced channels starting from 4-6 GHz with a 4 GHz increment in corner frequencies, in each consecutive channel, all channels having 2 GHz bandwidth.

4. The switched multiplexer of claim 1,
wherein the first block has four channels; wherein odd channel non-contiguous multiplexers comprises 14-16 GHz, 10-12 GHz, 6-8 GHz and 2-4 GHz channels which are formed such that a 14 GHz lowpass filter of a 14 GHz diplexer is connected to 10 GHz diplexer, lowpass filter of 10 GHz diplexer is connected to 6 GHz diplexer, lowpass filter of 6 GHz diplexer is connected to 2 GHz highpass filter;

wherein 14 GHz, 10 GHz and 6 GHz highpass filters belonging to the corresponding diplexers and 2 GHz highpass filter are respectively coupled to 16 GHz, 12 GHz, 8 GHz and 4 GHz diplexers;

wherein 16 GHz, 12 GHz, 8 GHz and 4 GHz highpass filters are terminated by 50 ohm resistances; wherein 16 GHz, 12 GHz, 8 GHz and 4 GHz lowpass filters are fed to the output.

5. The switched multiplexer of claim 1,
wherein the second block has four channels;
wherein even channel non-contiguous multiplexers comprises 16-18 GHz, 12-14 GHz, 8-10 GHz and 4-6 GHz channels which are formed such that 16 GHz lowpass filter of 16 GHz diplexer is coupled to 12 GHz diplexer, 12 GHz lowpass filter of 12 GHz diplexer is coupled to 8 GHz diplexer, 8 GHz lowpass filter of 8 GHz diplexer is coupled to 4 GHz diplexer;

wherein 16 GHz, 12 GHz, 8 GHz and 4 GHz highpass filters belonging to the corresponding diplexers are respectively coupled to 18 GHz lowpass filter, 14 GHz, 10 GHz and 6 GHz diplexers;

wherein 4 GHz lowpass filter is terminated by 50 ohm resistance and highpass filter is fed to the output;

wherein 14 GHz, 10 GHz and 6 GHz highpass filters are terminated by 50 ohm resistances and 14 GHz, 10 GHz and 6 GHz lowpass filters are fed to the output.

6. The switched multiplexer of claim 1, wherein the value of the resistor is 50 ohm.

7. The switched multiplexer of claim 1, wherein in the first and second blocks, the diplexers forming the blocks use Open Circuited Parallel Coupled Line—OCPCL for diplexing.

8. The switched multiplexer of claim 1, wherein in the first and second blocks, the diplexers forming the blocks are designed by using singly terminated filter design approach.

* * * * *